US012650590B1

(12) United States Patent
Sun

(10) Patent No.: US 12,650,590 B1
(45) Date of Patent: Jun. 9, 2026

(54) CHILD BORESCOPE

(71) Applicant: Jixiu Sun, Shaoyang City (CN)

(72) Inventor: Jixiu Sun, Shaoyang City (CN)

( * ) Notice: Subject to any disclaimer, the term of this patent is extended or adjusted under 35 U.S.C. 154(b) by 0 days.

(21) Appl. No.: 19/260,870

(22) Filed: Jul. 7, 2025

(30) Foreign Application Priority Data

Jun. 13, 2025 (CN) .......................... 202521238427.5

(51) Int. Cl.
| | |
|---|---|
| *G02B 23/00* | (2006.01) |
| *G02B 7/02* | (2021.01) |
| *G02B 23/16* | (2006.01) |
| *G02B 23/24* | (2006.01) |

(52) U.S. Cl.
CPC .............. *G02B 23/16* (2013.01); *G02B 7/02* (2013.01); *G02B 23/2484* (2013.01)

(58) Field of Classification Search
CPC ...... G02B 23/00; G02B 23/08; G02B 23/125; G02B 23/14; G02B 23/16; G02B 23/22; G02B 23/24; G02B 23/2407; G02B 23/2476; G02B 23/2484; A61B 1/00016; A61B 1/00022; A61B 1/00034; A61B 1/00041; A61B 1/00048; A61B 1/0005; A61B 1/00052; A61B 1/00066; A61B 1/00103; A61B 1/00105; A61B 1/00108; A61B 1/00124; A61B 1/00144; A61B 1/005; A61B 1/051; A61B 1/0676; A61B 1/0684
See application file for complete search history.

(56) References Cited

U.S. PATENT DOCUMENTS

| | | | | |
|---|---|---|---|---|
| 8,189,043 | B2 * | 5/2012 | Schneider | .......... A61B 1/00108 348/82 |
| 9,568,953 | B2 * | 2/2017 | Liu | ........................ G06F 1/1656 |
| 2013/0126372 | A1 * | 5/2013 | Song | ...................... G06F 1/1626 206/320 |
| 2013/0331156 | A1 * | 12/2013 | Lui | ....................... H04B 1/3888 455/575.8 |
| 2019/0282071 | A1 | 9/2019 | Ouyang et al. | |
| 2024/0225426 | A1 | 7/2024 | Sun | |

FOREIGN PATENT DOCUMENTS

CN    217279114 U    8/2022

OTHER PUBLICATIONS

Machine English translation of the Chinese reference No. CN 217279114 published on Aug. 23, 2022.*

* cited by examiner

*Primary Examiner* — Thong Q Nguyen

(57) ABSTRACT

A child borescope relates to the technical field of borescopes, and includes: a handheld terminal, where the handheld terminal includes an image display part, and the image display part is provided with a display screen; a camera assembly connected to the handheld terminal; and a protective shell, where the protective shell detachably covers a circumferential edge of the image display part and is provided with an observation hole corresponding to the display screen. The protection of the display screen is achieved by covering the protective shell on a circumferential edge of the image display part and forming an observation hole corresponding to the display screen on the protective shell, thereby effectively preventing the display screen from cracking or even breaking when the device falls or is squeezed against hard objects. The present invention has a simple and compact structure, strong practicability and is conducive to market promotion.

11 Claims, 8 Drawing Sheets

A

CHILD BORESCOPE

CROSS-REFERENCE TO RELATED APPLICATIONS

The application claims priority of Chinese patent application 202521238427.5, filed on Jun. 13, 20245, which is incorporated herein by reference in its entireties.

TECHNICAL FIELD

The present invention relates to the technical field of borescopes, and specifically to a child borescope.

BACKGROUND

In recent years, children's outdoor exploration education has gradually become popular. A borescope device has been widely used in natural exploration scenarios such as cave exploration and rock crevice observation because of the characteristic of extending and observing small spaces.

A conventional child borescope is mostly handheld in design, with an integrated miniature camera and display screen, which display detection images in real time via wired or wireless transmission. In actual use, children often cause the device to fall, collide, or be squeezed against hard objects due to large range of activities and uncontrollable operating movements. A display screen in the existing child borescope lacks a structural protective shell, and the corners and edge areas are prone to cracks or even shatters when impacted.

SUMMARY

An objective of the present invention is to solve the problem in the prior art that a device often falls, collides, and is squeezed against hard objects when children use a child borescope, and a display screen of the existing child borescope lacks a structural protective shell frame, which makes four corners and edge areas of the display screen prone to crack or even break when impacted. The present invention provides a child borescope.

A technical solution adopted by the present invention is as follows: a child borescope includes: a handheld terminal, where the handheld terminal includes an image display part, and the image display part is provided with a display screen; a camera assembly, where the camera assembly is connected to the handheld terminal; and a protective shell, where the protective shell detachably covers a circumferential edge of the image display part and is provided with an observation hole corresponding to the display screen.

Optionally, the protective shell protrudes from the display screen.

Optionally, a fixed frame is arranged between the image display part and the protective shell, the protective shell is sleeved on the fixed frame, and the protective shell is fixedly connected to the image display part through the fixed frame.

Optionally, the image display part is provided with a mounting groove, and the fixed frame is mounted in the mounting groove.

Optionally, a size of the mounting groove is adapted to that of the protective shell, a plurality of clamping grooves are arranged on an inner wall of the mounting groove, a plurality of clamping blocks are correspondingly arranged on an outer side wall of the fixed frame, and the clamping blocks are clamped with the clamping grooves.

Optionally, a fixed space is formed between the fixed frame and a bottom wall of the mounting groove, and a limiting ring is protrudingly arranged on an inner wall of the protective shell, and the limiting ring is positioned in the fixed space.

Optionally, a limiting flange is arranged on the inner wall of the mounting groove, and a limiting groove cooperating with the limiting flange is provided on a position of the limiting ring corresponding to the limiting flange.

Optionally, at least one guide groove is also provided on the inner wall of the mounting groove, and at least one guide block for slidably cooperating with the guide groove is correspondingly provided on the fixed frame.

Optionally, the image display part is recessed to form a protective groove, and the display screen is arranged on a bottom wall of the protective groove.

Optionally, a side wall of the fixed frame is arc-shaped, and the inner wall of the protective shell corresponds to an outer wall of the fixed frame in shape.

According to the present invention, the protection of the display screen is achieved by detachably covering the protective shell on the circumferential edge of the image display part and forming an observation hole corresponding to the display screen on the protective shell, thereby effectively preventing the display screen from cracking or even breaking when the device falls, collides, or is squeezed against hard objects. The present invention has a simple and compact structure, strong practicability and is conducive to market promotion.

BRIEF DESCRIPTION OF DRAWINGS

To describe the technical solutions in embodiments of the present invention or in the conventional technology more clearly, the following briefly describes the accompanying drawings for describing embodiments or the conventional technology. It is clear that the accompanying drawings in the following description show merely some embodiments of the present invention, and a person of ordinary skill in the art may still derive other drawings from these accompanying drawings without creative efforts.

Figure 1:
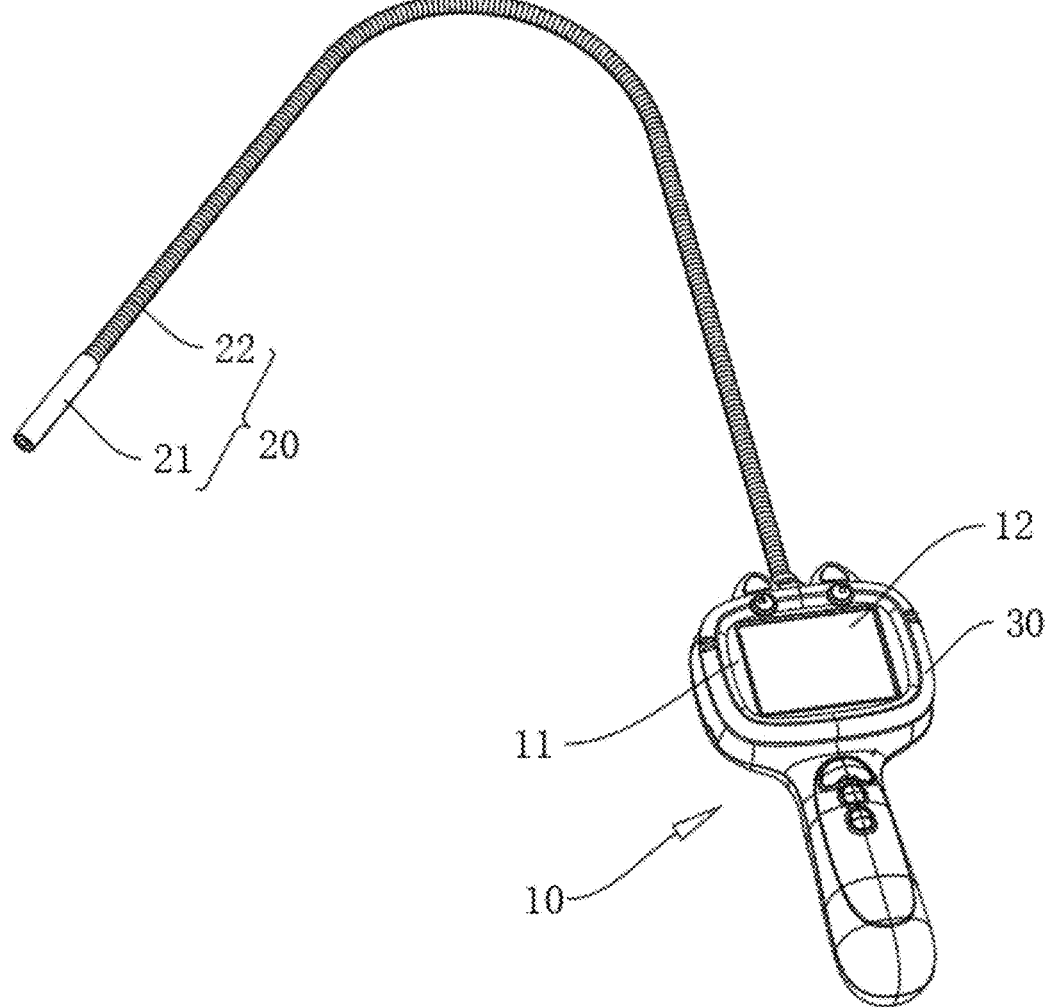
FIG. 1 is a schematic diagram of an entire structure according to this embodiment.

Description of the reference numerals: 10. handheld terminal; 11. image display part; 111. mounting groove; 1111. clamping groove; 1112. limiting flange; 1113. guide groove; 112. fixed space; 113. protective groove; 12. display screen; 20. camera assembly; 21. camera body; 22. connecting pipe; 30. protective shell; 301. decorative member; 31. limiting ring; 311. limiting groove; 40. fixed frame; 41. clamping block; 42. guide block; 50. control module; 60. battery module; and 70. key module.

DETAILED DESCRIPTION OF EMBODIMENTS

Figure 2:
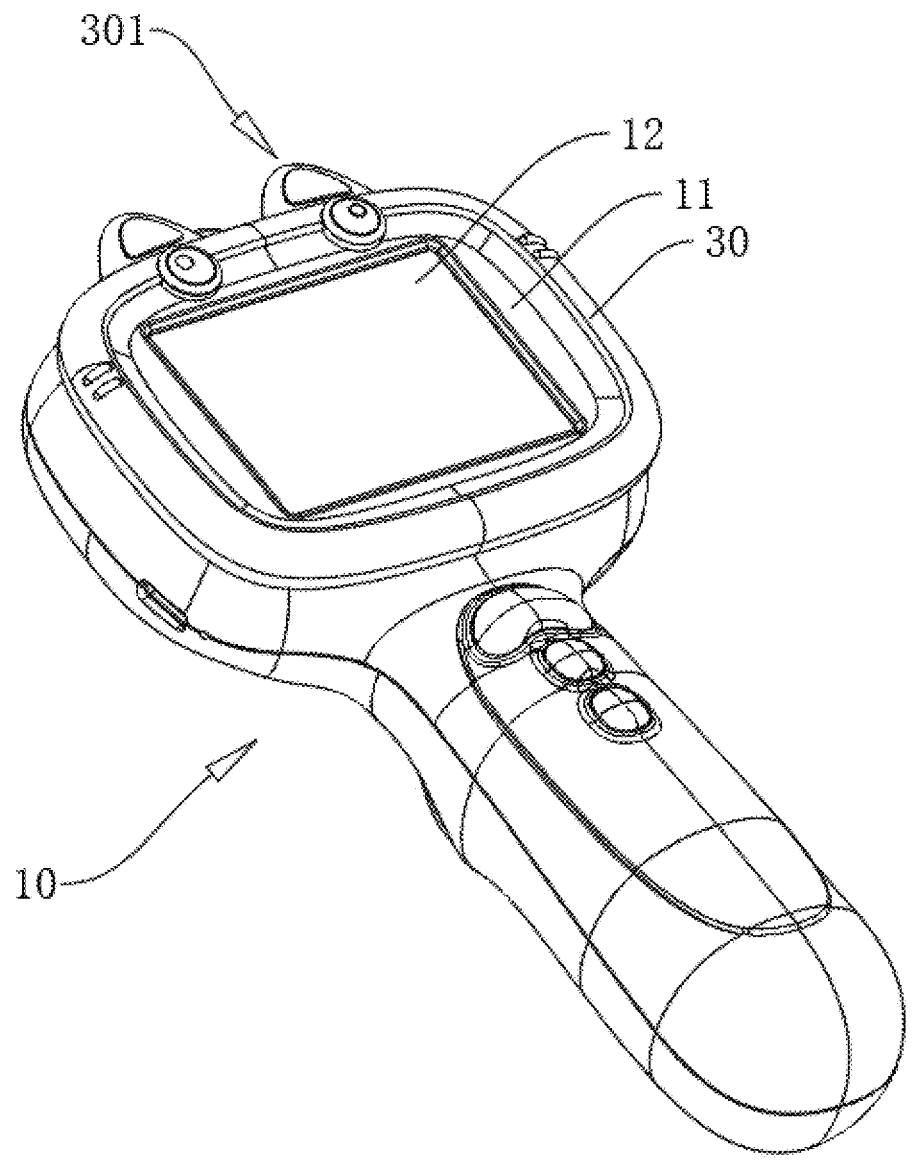
FIG. 2 is a diagram showing a handheld terminal according to this embodiment.
Figure 3:
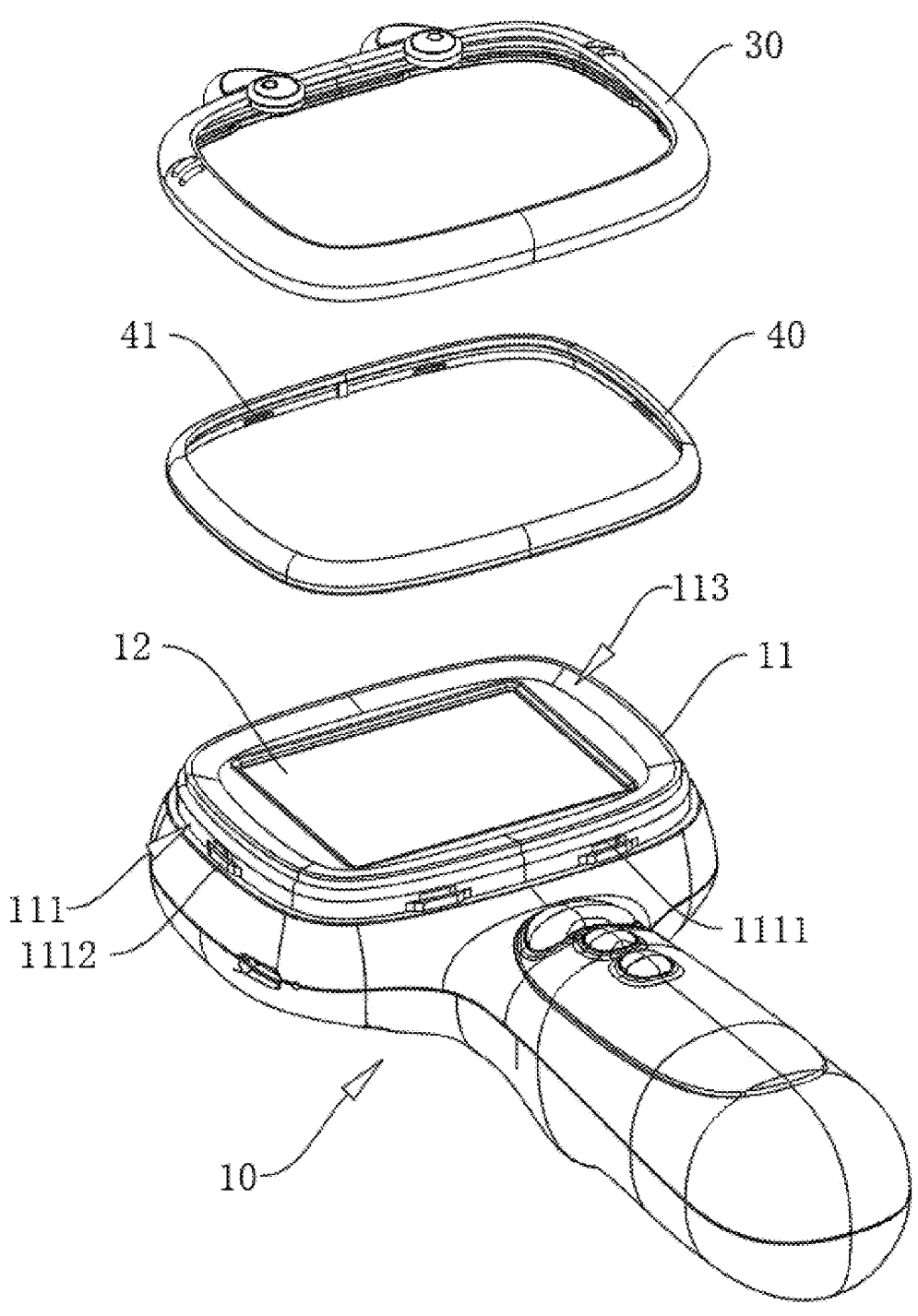
FIG. 3 is a schematic diagram of an assembly relationship between an image display part, a protective shell and a fixed frame according to this embodiment.
Figure 4:
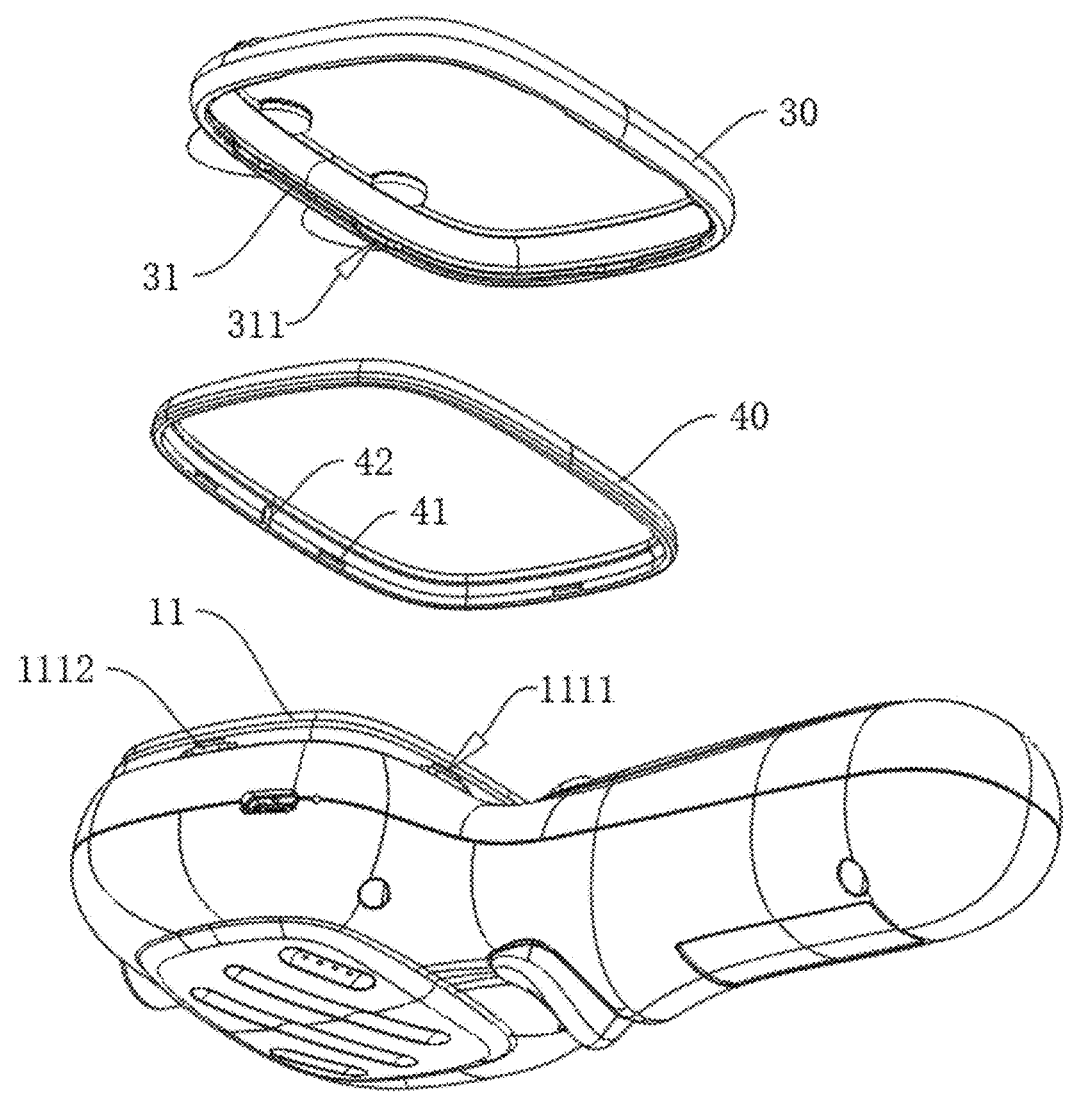
FIG. 4 is a diagram of FIG. 3 from another perspective.
Figure 5:
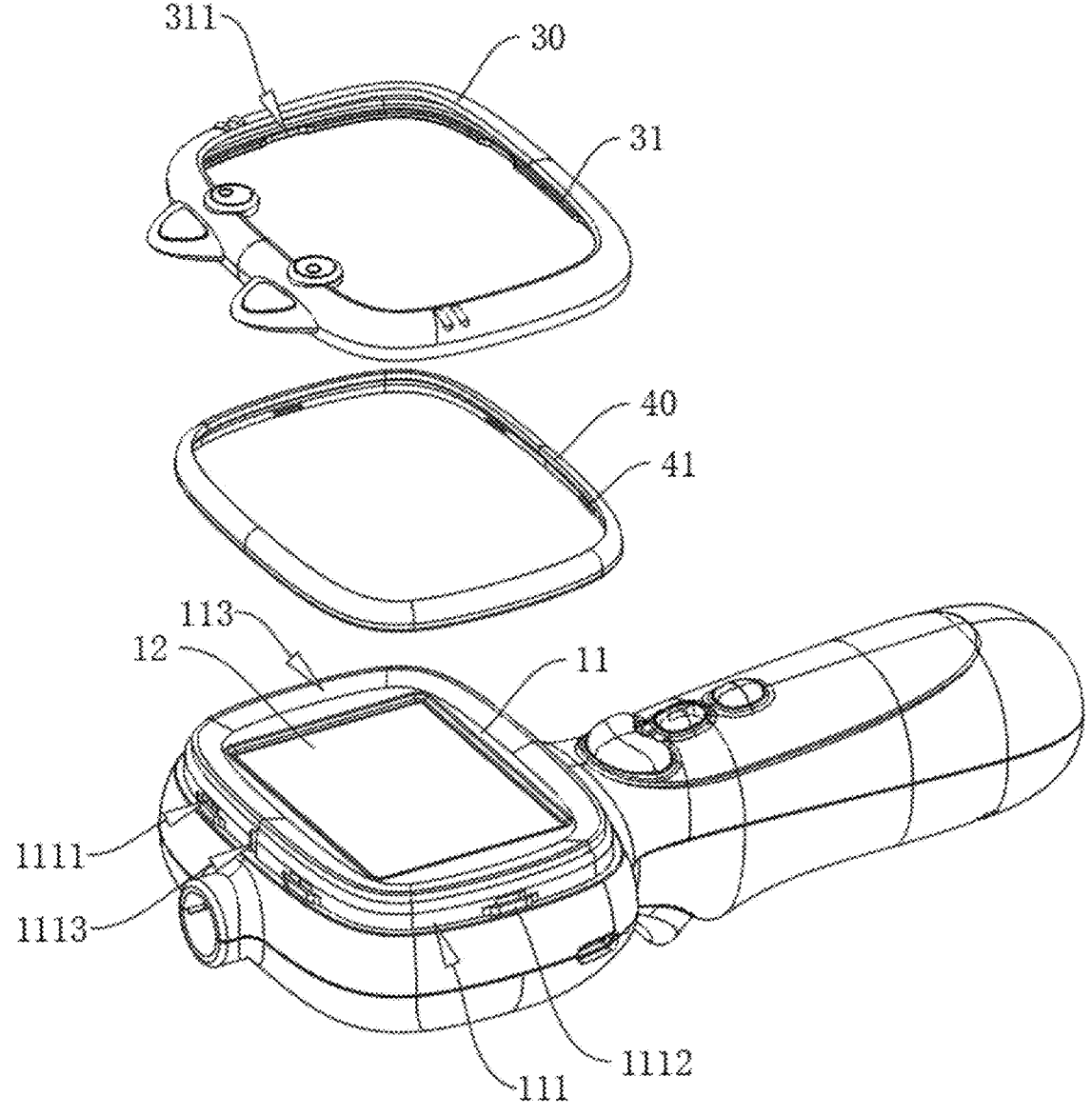
FIG. 5 is a diagram of FIG. 4 from another perspective.
Figure 6:
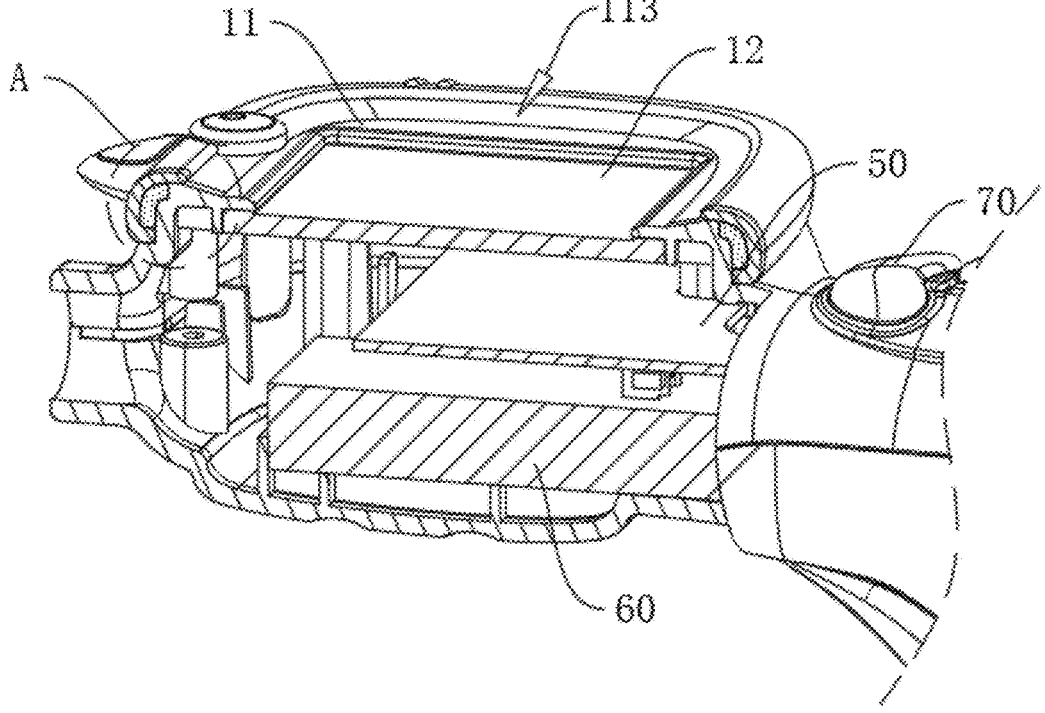
FIG. 6 is a partial cross-sectional view of this embodiment.
Figure 7:
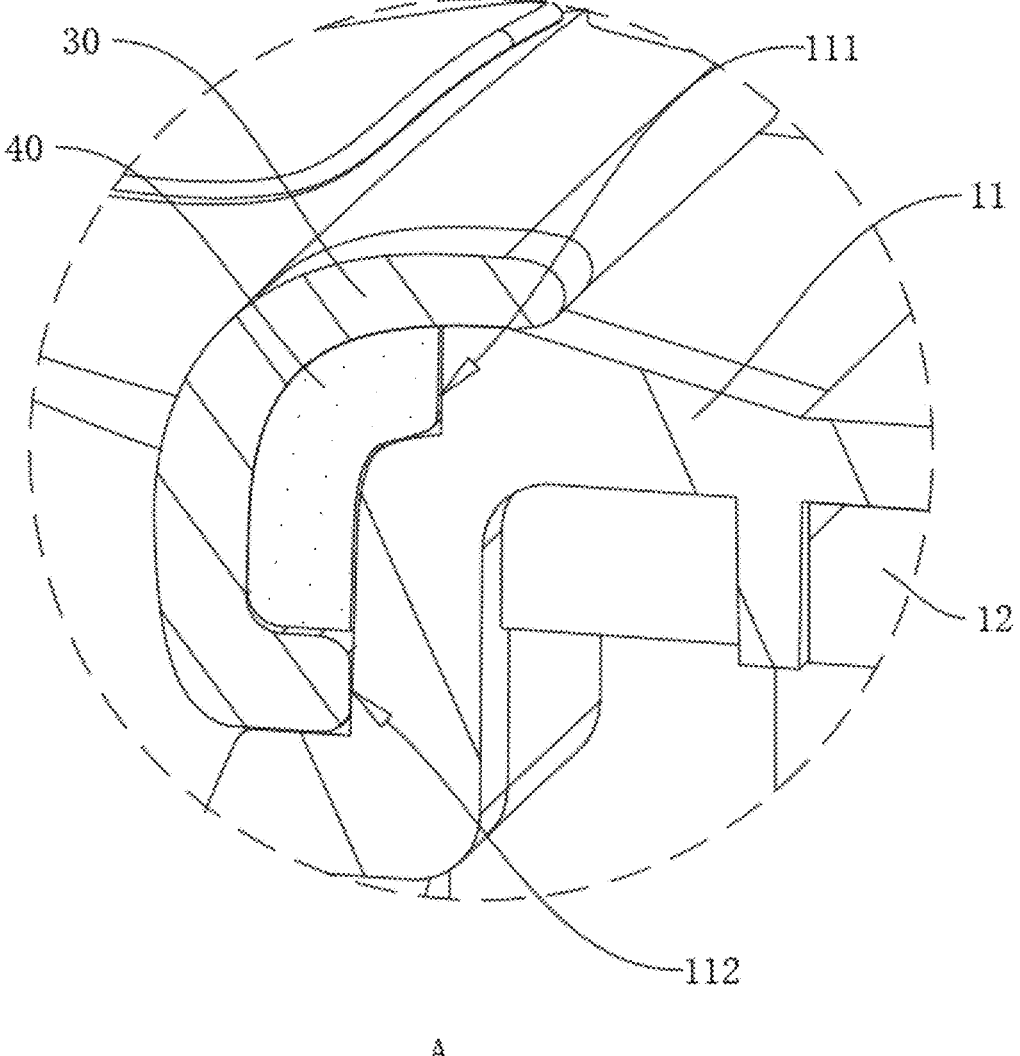
FIG. 7 is an enlarged view of A in FIG. 6.
Figure 8:
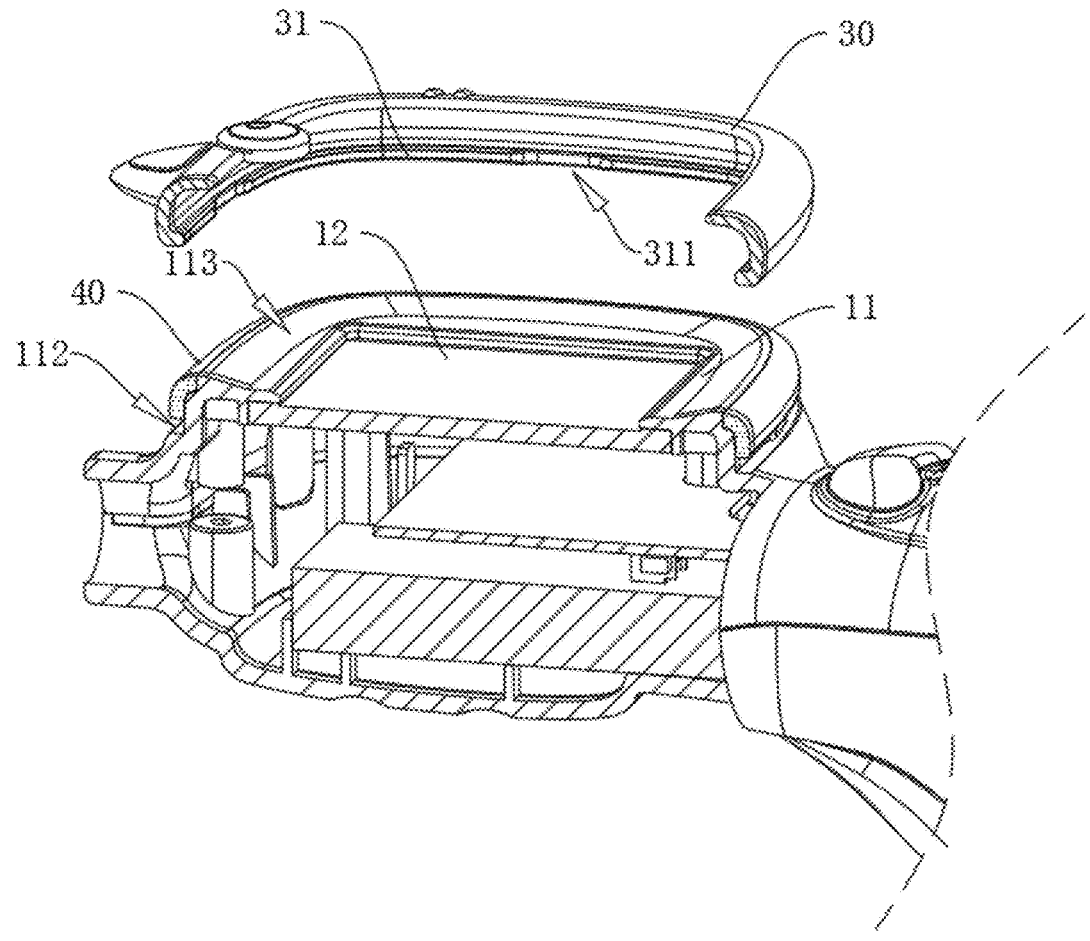
FIG. 8 is a schematic diagram of the cooperation between a fixed frame and a fixed space.

The technical solutions in the embodiments of the present invention will be clearly and completely described below with reference to FIGS. 1 to 8 in the embodiments of the present invention. It is apparent that the described embodiments are only some, but not all, embodiments of the present invention. Based on the embodiments of the present invention, all other embodiments obtained by those of ordinary skill in the art without creative efforts fall within the protection scope of the present invention.

It should be noted that, if directional indications (such as upper, lower, left, right, front and rear) are involved in the embodiments of the present invention, the directional indications are only used to explain the relative positional relationships, the motion situations and the like between individual components under a certain pose (as shown in the drawings), and if the certain pose is changed, the directional indications are changed accordingly.

In addition, if there are descriptions relating to "first", "second" and the like in the embodiments of the present invention, the descriptions of "first", "second" and the like are for descriptive purposes only and are not to be construed as indicating or implying relative importance thereof or implicitly indicating the quantities of the indicated technical features. Thus, a feature defined by "first" or "second" may explicitly or implicitly include at least one such feature. In addition, "and/or" appearing herein is meant to include three parallel solutions, and taking "A and/or B" as an example, it includes solution A, or solution B, or both solution A and solution B. In addition, the technical solutions among various embodiments may be combined with each other, however, this combination must be based on that it can be realized by those of ordinary skill in the art. When the combination of the technical solutions is contradictory or cannot be realized, such a combination of the technical solutions should not be considered to exist, and is not within the protection scope of the present invention.

This embodiment relates to a child borescope, referring to FIGS. 1 to 8, which includes a handheld terminal 10, a camera assembly 20 and a protective shell 30, where the handheld terminal 10 includes an image display part 11, the image display part 11 is provided with a display screen 12, the camera assembly 20 is detachably connected to the handheld terminal 10, and the camera assembly 20 is electrically connected to the display screen 12, so that a picture captured by the camera assembly 20 may be transmitted to the display screen 12 for display. The protective shell 30 detachably covers a circumferential edge of the image display part 11, and the protective shell 30 is provided with an observation hole corresponding to the display screen 12.

The camera assembly 20 includes a camera body 21 and a connecting pipe 22, two ends of the connecting pipe 22 are respectively fixedly connected to the camera body 21 and the handheld terminal 10, an electric wire is arranged inside the connecting pipe 22, and the camera body 21 is electrically connected to the handheld terminal 10 via the electric wire.

During the use, the camera assembly 20 captures video images and transmits the video images in real time to the display screen 12 for display, allowing a user to view the images captured by the camera assembly 20 in real time via the display screen 12. The protective shell 30 is covered on a circumferential edge of the image display part 11 to protect the display screen 12, and when a device falls, collides, and is squeezed against hard objects, the protective shell 30 can protect the display screen 12, so that the cracking of the display screen 12 is effectively avoided.

Further, the protective shell 30 is arranged to protrude from the display screen 12.

The protective shell 30 is arranged to protrude from the display screen 12, that is, the circumferential edge of the protective shell 30 extends outward relative to a plane where the display screen 12 is positioned in the mounting state. When the protective shell 30 covers the circumferential edge of the image display part 11, a flange of the protective shell 30 completely covers the edge area of the display screen 12 and extends outward, when the device falls or is squeezed against hard objects, the flange firstly bears external impact load, and the energy is absorbed through the deformation of the material, so that four corners and edges of the display screen 12 are prevented from directly contacting collision surfaces. In this process, an isolation space is formed between the flange of the protective shell 30 and the display screen 12, and the risk of the impact stress being transmitted to the display screen 12 is further reduced.

In addition, the protective shell is further provided with a decorative member 301. In this embodiment, the decorative member 301 is a cat eye and a cat ear. In other embodiments, the decorative member 301 may also be a decorative product with other shapes or structures. The protective shell is made of one or more of silica gel, thermoplastic polyurethane, thermoplastic elastomer, and soft rubber.

Further, a fixed frame 40 is arranged between the image display part 11 and the protective shell 30, the protective shell 30 is sleeved on the fixed frame 40, and the protective shell 30 is fixedly connected to the image display part 11 through the fixed frame 40.

A fixed frame 40 is provided between the image display part 11 and the protective shell 30 to enable detachable connection of the protective shell 30 to the image display part 11, thereby facilitating assembly of the protective shell 30. Meanwhile, the fixed frame 40 is additionally arranged to form a secondary buffer structure, so that a space isolation is formed between an assembly interface of the protective shell 30 and a mounting interface of the display screen 12, and the direct influence of mechanical vibration on the display screen 12 is effectively reduced.

Further, the image display part 11 is provided with a mounting groove 111, and the fixed frame 40 is mounted in the mounting groove 111.

In the mounting process, the fixed frame 40 is first fixed in the mounting groove 111, and then the protective shell 30 is fixed on the fixed frame 40, so that the protective shell 30 is mounted on the image display part 11, which is simple and convenient to operate and easy to replace the protective shell 30.

It should be noted that the fixed frame 40 is configured to fix the protective shell 30, so that the protective shell 30 is not easily displaced, and the display screen 12 may be stably protected.

Further, a size of the mounting groove 111 is adapted to that of the protective shell 30, a plurality of clamping grooves 1111 are arranged on an inner wall of the mounting groove 111, a plurality of clamping blocks 41 are correspondingly arranged on an outer side wall of the fixed frame 40, and the clamping blocks 41 are clamped with the clamping grooves 1111.

When the protective shell 30 needs to be mounted to the image display part 11, the fixed frame 40 is first inserted into the mounting groove 111. Since the size of the mounting groove 111 matches that of the protective shell 30, the clamping block 41 on the outer side wall of the fixed frame 40 is elastically deformed under pressure until the clamping block is completely embedded inside the clamping groove 1111. In this case, a contact surface between the clamping block 41 and the clamping groove 1111 forms an interlocking structure, so as to prevent the fixed frame 40 from being displaced when subjected to external force.

Further, a fixed space 112 is formed between the fixed frame 40 and a bottom wall of the mounting groove 111, and a limiting ring 31 is protrudingly arranged on an inner wall of the protective shell 30, and the limiting ring 31 is positioned in the fixed space 112.

In the mounting process, the protective shell 30 is embedded into the fixed space 112 through the limiting ring 31, and the limiting ring 31 is positioned and constrained by the circumferential wrapping of the limiting ring 31 by the fixed space 112 to fix the protective shell 30. When external impact force acts on the protective shell 30, the contact surface between the limiting ring 31 and the fixed space 112 forms a support, so that the impact force is transmitted to the bottom wall of the mounting groove 111 through the fixed frame 40, avoiding direct action on the display screen 12.

Further, a limiting flange 1112 is arranged on the inner wall of the mounting groove 111, and a limiting groove 311 cooperating with the limiting flange 1112 is provided on a position of the limiting ring 31 corresponding to the limiting flange 1112.

The limiting flange 1112 refers to a protruding structure circumferentially provided along the inner wall of the mounting groove 111, and the limiting groove 311 refers to a recessed structure provided on the inner wall of the limiting ring 31. During the assembly of the protective shell 30, the fixed frame 40 slides along the surface of the limiting flange 1112 of the mounting groove 111 until the limiting flange 1112 is inserted into the limiting groove 311 of the limiting ring. The cooperation between the limiting flange 1112 and the limiting groove 311 forms a positioning constraint to prevent the protective shell 30 from being separated from the fixed frame 40 due to the inertial force when the device falls. Meanwhile, the circumferential wrapping of the limiting groove 311 on the limiting flange 1112 may prevent the protective shell 30 from rotating due to external force, thereby maintaining the precise alignment relationship between the observation hole and the display screen 12.

Further, at least one guide groove 1113 is also provided on the inner wall of the mounting groove 111, and at least one guide block 42 for slidably cooperating with the guide groove 1113 is correspondingly provided on the fixed frame 40.

The guide groove 1113 and the guide block 42 cooperate to guide the fixed frame 40 to move in a predetermined direction, so that the fixed frame 40 maintains the stability of the motion trajectory in the mounting process. That is, the guide groove 1113 and the guide block 42 cooperate to limit the moving path of the fixed frame 40, thereby avoiding position displacement of the fixed frame 40 in the installation process, and improving the assembly accuracy.

Further, the image display part 11 is recessed to form a protective groove 113, and the display screen 12 is arranged on a bottom wall of the protective groove 113.

The protective groove 113 refers to a receiving space formed by inward recess of a surface of the image display part 11, and the display screen 12 being arranged on the bottom wall of the protective groove 113 refers to a mounting plane of the display screen 12 being fixedly fitted to a bottom of the protective groove 113. Specifically, when the image display part 11 is subjected to external impact, the recessed structure of the protective groove 113 makes the edge area contact the external object first, and the impact force is dispersed and transmitted to the shell of the image display part 11 through the side wall, thereby avoiding direct impact on the surface of the display screen 12.

Further, a side wall of the fixed frame 40 is arc-shaped, and the inner wall of the protective shell 30 corresponds to an outer wall of the fixed frame 40 in shape.

When the protective shell 30 is mounted to the fixed frame 40, the curved surface of the inner wall of the protective shell is in full contact with the arc-shaped outer surface of the side wall of the fixed frame 40. When subjected to external squeezing or impact, the geometric characteristics of the arc-shaped side wall may evenly transfer the impact energy to the fixed frame 40 along the curved surface. Meanwhile, the fitting surfaces of the protective shell 30 and the fixed frame 40 form multi-point contact support to avoid structural deformation caused by excessive local force.

In addition, in another embodiment, the handheld terminal 10 further includes a control module 50, a battery module 60, and a key module 70, where the control module 50, the battery module 60, and the key module 70 are all electrically connected, the display screen 12 and the camera assembly 20 are both electrically connected to the control module 50 to control the display screen 12 and the camera assembly 20, and the battery module 60 is configured to supply power to the display screen 12 and the camera assembly 20, so that the display screen 12 and the camera assembly 20 may be stably in an operating state. Since the control module 50, the battery module 60 and the key module 70 are conventional technical means in the art and are not the invention of the present application, these modules are not described in detail.

The above description is only intended to illustrate the technical solution of the present invention and not to limit the present invention, and other modifications or equivalent substitutions made by those skilled in the art to the technical solution of the present invention should be covered by the scope of the claims of the present invention without departing from the spirit and scope of the technical solution of the present invention.

What is claimed is:

1. A child borescope, comprising:
   a handheld terminal (10), wherein the handheld terminal (10) comprises an image display part (11), and the image display part (11) is provided with a display screen (12);
   a camera assembly (20), wherein the camera assembly (20) comprises a camera body (21) and a connecting pipe (22), and two ends of the connecting pipe (22) are fixedly connected to the camera body (21) and the handheld terminal (10) respectively; and
   a protective shell (30), wherein the protective shell (30) detachably covers a circumferential edge of the image display part (11), and the protective shell (30) is provided with an observation hole corresponding to the display screen (12);
   wherein a fixed frame (40) is arranged between the image display part (11) and the protective shell (30); the image display part (11) is provided with a mounting groove (111);
   wherein a size of the mounting groove (111) is adapted to a size of the protective shell (30), a plurality of clamping grooves (1111) are arranged on an inner wall of the mounting groove (111), a plurality of clamping blocks (41) are correspondingly arranged on an inner wall of the fixed frame (40), and the clamping blocks (41) are clamped with the clamping grooves (1111).

2. The child borescope according to claim 1, wherein the protective shell (30) is arranged to protrude from the display screen (12).

3. The child borescope according to claim 2, wherein the protective shell (30) is sleeved on the fixed frame (40), and the protective shell (30) is fixedly connected to the image display part (11) through the fixed frame (40).

4. The child borescope according to claim 3, wherein a side wall of the fixed frame (40) is arc-shaped, and an inner wall of the protective shell (30) corresponds to an outer wall of the fixed frame (40) in shape.

5. The child borescope according to claim 1, wherein a fixed space (112) is formed between the fixed frame (40) and a bottom wall of the mounting groove (111), a limiting ring (31) is protrudingly arranged on an inner wall of the protective shell (30), and the limiting ring (31) is positioned in the fixed space (112).

6. The child borescope according to claim 5, wherein a limiting flange (1112) is also arranged on an inner wall of the mounting groove (111), and a limiting groove (311) cooperating with the limiting flange (1112) is provided on a position of the limiting ring (31) corresponding to the limiting flange (1112).

7. The child borescope according to claim 1, wherein at least one guide groove (1113) is also provided in the mounting groove (111), and at least one guide block (42) for slidably cooperating with the guide groove (1113) is correspondingly provided on the fixed frame (40).

8. The child borescope according to claim 1, wherein the image display part (11) is recessed to form a protective groove (113), and the display screen (12) is arranged on a bottom wall of the protective groove (113).

9. A child borescope, comprising:
a handheld terminal (10), wherein the handheld terminal (10) comprises an image display part (11), and the image display part (11) is provided with a display screen (12);
a camera assembly (20), wherein the camera assembly (20) comprises a camera body (21) and a connecting pipe (22), and two ends of the connecting pipe (22) are fixedly connected to the camera body (21) and the handheld terminal (10) respectively; and
a protective shell (30), wherein the protective shell (30) detachably covers a circumferential edge of the image display part (11), and the protective shell (30) is provided with an observation hole corresponding to the display screen (12);
wherein a fixed frame (40) is arranged between the image display part (11) and the protective shell (30); the image display part (11) is provided with a mounting groove (111);
wherein a fixed space (112) is formed between the fixed frame (40) and a bottom wall of the mounting groove (111), a limiting ring (31) is protrudingly arranged on an inner wall of the protective shell (30), and the limiting ring (31) is positioned in the fixed space (112).

10. The child borescope according to claim 9, wherein a limiting flange (1112) is also arranged on an inner wall of the mounting groove (111), and a limiting groove (311) cooperating with the limiting flange (1112) is provided on a position of the limiting ring (31) corresponding to the limiting flange (1112).

11. A child borescope, comprising:
a handheld terminal (10), wherein the handheld terminal (10) comprises an image display part (11), and the image display part (11) is provided with a display screen (12);
a camera assembly (20), wherein the camera assembly (20) comprises a camera body (21) and a connecting pipe (22), and two ends of the connecting pipe (22) are fixedly connected to the camera body (21) and the handheld terminal (10) respectively; and
a protective shell (30), wherein the protective shell (30) detachably covers a circumferential edge of the image display part (11), and the protective shell (30) is provided with an observation hole corresponding to the display screen (12);
wherein a fixed frame (40) is arranged between the image display part (11) and the protective shell (30); the image display part (11) is provided with a mounting groove (111);
wherein at least one guide groove (1113) is also provided in the mounting groove (111), and at least one guide block (42) for slidably cooperating with the guide groove (1113) is correspondingly provided on the fixed frame (40).

* * * * *